(12) United States Patent
Tsai

(10) Patent No.: US 8,333,483 B2
(45) Date of Patent: Dec. 18, 2012

(54) BACKLIGHT MODULE

(75) Inventor: Tai-Sheng Tsai, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 364 days.

(21) Appl. No.: 12/749,459

(22) Filed: Mar. 29, 2010

(65) Prior Publication Data
US 2010/0309683 A1 Dec. 9, 2010

(30) Foreign Application Priority Data

Jun. 8, 2009 (CN) .......................... 2009 1 0303057

(51) Int. Cl.
G09F 13/04 (2006.01)
G09F 13/08 (2006.01)

(52) U.S. Cl. ..................................... 362/97.1; 362/97.2

(58) Field of Classification Search ................. 362/97.1, 362/97.3, 330, 297, 298, 299, 300, 301
See application file for complete search history.

(56) References Cited

U.S. PATENT DOCUMENTS

| | | | | |
|---|---|---|---|---|
| 6,065,846 A * | 5/2000 | Kato et al. | | 362/30 |
| 7,677,749 B2 * | 3/2010 | Chang et al. | | 362/97.1 |
| 7,695,165 B2 * | 4/2010 | Chang | | 362/307 |
| 7,740,374 B2 * | 6/2010 | Chang | | 362/240 |
| 7,819,542 B2 * | 10/2010 | Sato | | 362/97.1 |
| 2005/0073846 A1 * | 4/2005 | Takine | | 362/296 |
| 2005/0180124 A1 * | 8/2005 | Adachi et al. | | 362/30 |
| 2006/0124835 A1 * | 6/2006 | Kiyomoto et al. | | 250/216 |
| 2006/0193149 A1 * | 8/2006 | Noh et al. | | 362/611 |
| 2008/0261339 A1 * | 10/2008 | Koung et al. | | 438/27 |
| 2008/0266879 A1 * | 10/2008 | Chang | | 362/309 |
| 2009/0016068 A1 * | 1/2009 | Chang | | 362/309 |
| 2011/0096548 A1 * | 4/2011 | Pickard | | 362/294 |

FOREIGN PATENT DOCUMENTS

| | | |
|---|---|---|
| CN | 2588406 Y | 11/2003 |
| CN | 1588201 A | 3/2005 |

* cited by examiner

*Primary Examiner* — Mariceli Santiago
*Assistant Examiner* — Glenn Zimmerman
(74) *Attorney, Agent, or Firm* — Altis Law Group, Inc.

(57) ABSTRACT

The backlight module includes a light source, a diffusion plate, a substrate and a reflector. The diffusion plate has a light incident surface and a light emitting surface at two opposite sides. The reflector is positioned on the light incident surface and faces the light source. The substrate includes an aspherical surface, a reflective film formed on the aspherical surface, and a recess defined in the aspherical surface. The reflective film faces the light incident surface. The light source is received in the recess. Light emitted from the light source is reflected to the reflective film by the reflector, then reflected to the light incident surface of the diffusion plate, and exits from the light emitting surface of the diffusion plate.

13 Claims, 2 Drawing Sheets

BACKLIGHT MODULE

BACKGROUND

1. Technical Field

The present disclosure relates to a liquid crystal display and, particularly, to a backlight module having a point light source and an aspherical light reflecting member.

2. Description of Related Art

Generally, a backlight module includes a light source and a light guide plate. The light source is adjacent to the light guide plate. Most backlight modules are bulky. Therefore, a liquid crystal display employing the backlight module has a large size.

Therefore, a new backlight module is desired to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
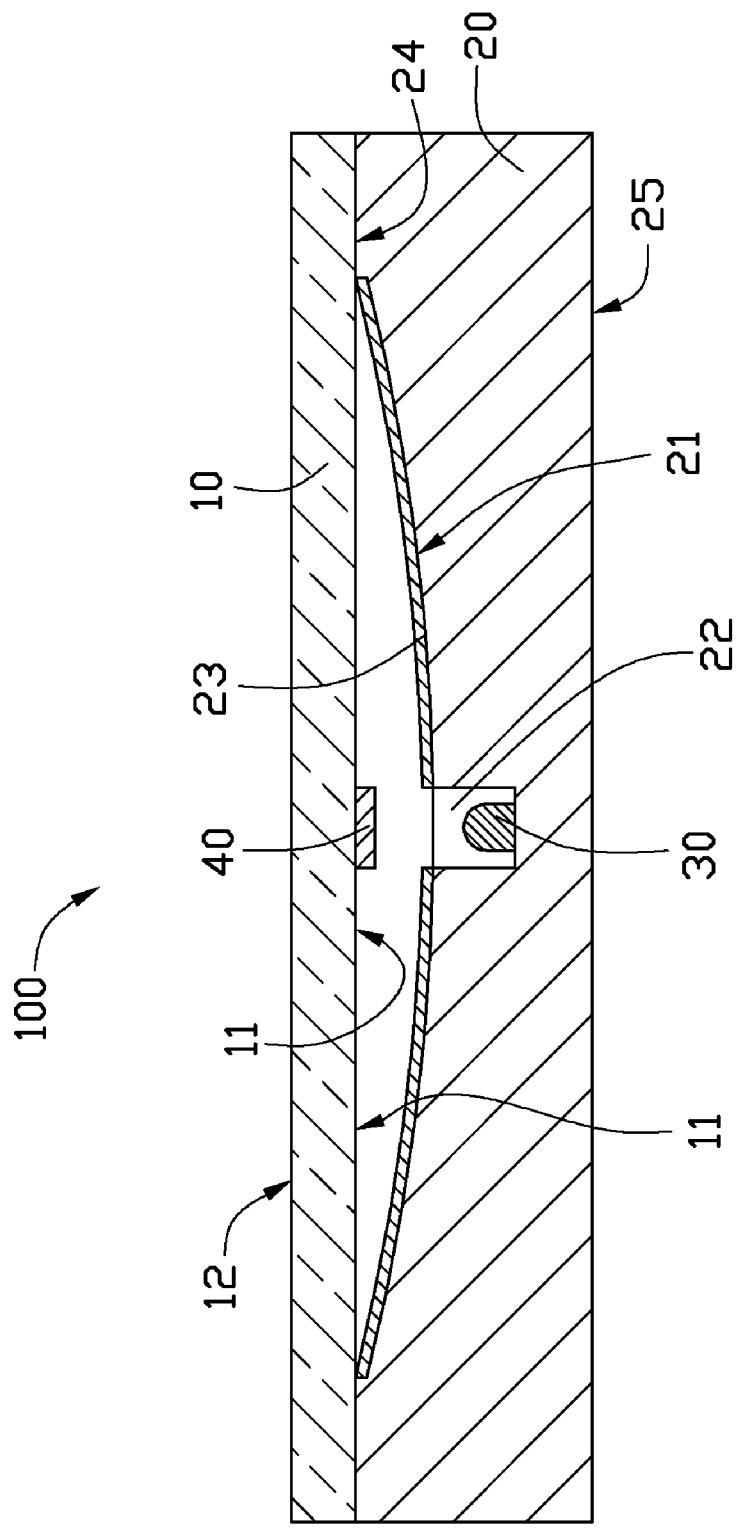
FIG. 1 is a cross-sectional view of a backlight module according to a first embodiment.

Referring to FIG. 1, a backlight module 100 according to a first embodiment is shown. The backlight module 100 includes a diffusion plate 10, a substrate 20, a light source 30, and a reflector 40.

The diffusion plate 10 includes a light incident surface 11 and a light emitting surface 12 aligned at the two opposite sides.

The substrate 20 includes an aspherical surface 21, a reflective film 23 formed on the aspherical surface 21, and a recess 22 defined in the aspherical surface 21. The reflective film 23 faces the light incident surface 11 of the diffusion plate 10. The reflective film 23 does not cover the light source 30 so that light emitted by the light source 30 can reach the reflector 40. The substrate 20 can be made of transparent material, such as polymethyl methacrylate (PMMA). The reflective film 23 can be made of material with high reflectivity, e.g., silver or magnesium.

The light source 30 is received in the recess 22. The light source 30 can be a light emitting diode (LED). In the present embodiment, the light source 30 is positioned at a focus point of the aspherical surface 21. A central axis of the light source 30 is coaxial with that of the substrate 20.

The reflector 40 is mounted on the light incident surface 11 of the diffusion plate 10. The reflector 40 directly faces the light source 30. In the present embodiment, the reflector 40 is circular.

In operation, the light source 30 emits light towards the reflector 40, the light is reflected by the reflector 40 to the reflective film 23, then reflected to the light incident surface 11 of the diffusion plate 10 by the reflective film 23, and finally exits from the light emitting surface 12 of the diffusion plate 10.

In the present embodiment, the light source 30 is received in the substrate 20. Accordingly, the backlight module 100 has a relatively small size.

Figure 2:
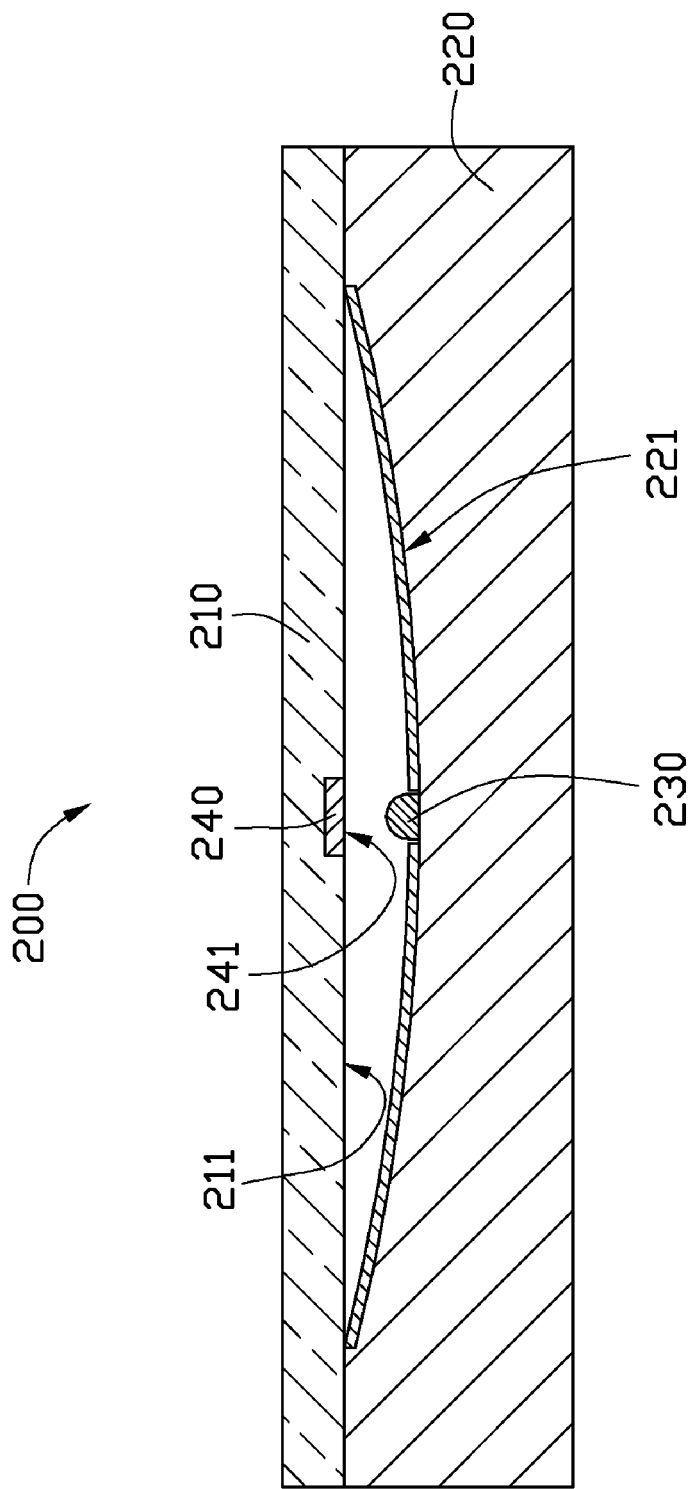
FIG. 2 is a cross-sectional view of a backlight module according to a second embodiment.

Referring to FIG. 2, a backlight module 200 according to a second embodiment is shown. The backlight module 200 includes a diffusion plate 210, a substrate 220, a light source 230, and a reflector 240. The diffusion plate 210 includes a light incident surface 211. The reflector 240 includes a light reflective surface 241. The substrate 220 includes an aspherical surface 221. The diffusion plate 210 includes a recess. The backlight module 200 is similar to the backlight module 100 of FIG. 1, except that the light source 230 is mounted on the aspherical surface 221, the reflector 240 is received in the recess of the diffusion plate 210, and the light reflective surface 241 is coplanar with the light incident surface 211.

While certain embodiments have been described and exemplified above, various other embodiments from the foregoing disclosure will be apparent to those skilled in the art. The present disclosure is not limited to the particular embodiments described and exemplified but is capable of considerable variation and modification without departure from the scope and spirit of the appended claims.

What is claimed is:

1. A backlight module comprising:
   a light source;
   a diffusion plate having a light incident surface and a light emitting surface at opposite sides thereof;
   a reflector positioned on the light incident surface opposite to the light source; and
   a substrate comprising an aspherical surface, a reflective film formed on the aspherical surface, and a recess defined in the aspherical surface, the reflective film facing the light incident surface, the light source being received in the recess;
   wherein the reflector is positioned at a focal point of the aspherical surface.

2. The backlight module of claim 1, wherein a central axis of the recess aligns with that of the substrate.

3. The backlight module of claim 2, wherein a central axis of the light source is coaxial with that of the substrate.

4. A backlight module comprising:
   a light source;
   a diffusion plate having a light incident surface and a light emitting surface at opposite sides thereof;
   a reflector positioned on the light incident surface and facing the light source; and
   a substrate comprising an aspherical surface, a reflective film formed on the aspherical surface, the reflective film facing the light incident surface, the light source being mounted on the aspherical surface;
   wherein the reflector is positioned in a focus point of the aspherical surface.

5. The backlight module of claim 4, wherein a central axis of the light source is coaxial with that of the substrate.

6. The backlight module of claim 4, wherein the light incident surface comprises a recess defined therein, and the reflector is received in the recess.

7. The backlight module of claim 6, wherein the reflector comprises a reflective surface, the reflective surface and the light incident, surface are coplanar.

8. A backlight module comprising:
   a diffusion plate having a light incident surface and a light emitting surface at opposite sides thereof, the light incident surface comprising a recess defined therein;
   a substrate comprising an aspherical light reflecting surface facing the light incident surface;

a light source mounted on the substrate and facing the light incident surface, for emitting light toward the light incident surface; and a reflector received in the recess for reflecting the light from the light source to the light reflecting surface;

wherein the reflector comprises a reflective surface facing the light source, the reflective surface and the light incident surface except for a portion that the recess faces are coplanar.

9. The backlight module of claim 8, wherein the reflector is circular.

10. The backlight module of claim 8, wherein the light source is arranged at a center of the light reflecting surface.

11. The backlight module of claim 8, wherein the light source is a point light source.

12. The backlight module of claim 8, wherein the reflector is positioned in a focus point of the aspherical surface.

13. The backlight module of claim 8, wherein a central axis of the light source is coaxial with a central axis of the substrate.

* * * * *